(12) United States Patent
Xu

(10) Patent No.: US 7,058,838 B2
(45) Date of Patent: Jun. 6, 2006

(54) SYSTEM AND METHOD FOR SYNCHRONIZING A PLURALITY OF PROCESSORS IN A MULTIPROCESSOR COMPUTER PLATFORM EMPLOYING A GLOBAL CLOCK COUNTER

(75) Inventor: Jianzhong Xu, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 497 days.

(21) Appl. No.: 10/322,073

(22) Filed: Dec. 17, 2002

(65) Prior Publication Data

US 2004/0117682 A1    Jun. 17, 2004

(51) Int. Cl.
*G06F 1/12* (2006.01)
(52) U.S. Cl. ......................... 713/400; 368/46; 714/707
(58) Field of Classification Search ...................... None See application file for complete search history.

(56) References Cited

U.S. PATENT DOCUMENTS

| 5,041,966 | A  |   | 8/1991 | Nakai et al. |
| 5,491,787 | A  | * | 2/1996 | Hashemi ....................... 714/11 |
| 6,535,926 | B1 | * | 3/2003 | Esker ........................... 709/248 |
| 6,550,062 | B1 | * | 4/2003 | Barajas et al. ................ 717/178 |

OTHER PUBLICATIONS

Tanenbaum, Andrew S., Structured Computer Organization, 1984, Prentice-Hall, Inc., 2$^{nd}$ edition, p. 11.*

* cited by examiner

*Primary Examiner*—Lynne H. Browne
*Assistant Examiner*—Anand B. Patel

(57) ABSTRACT

A system and method for synchronizing a plurality of processors in a multiprocessor computer platform are disclosed. In one system embodiment, a first processor and a second processor may access a global time value associated with a globally accessible clock counter. Each processor may access its respective local time value and adjust its respective synchronization parametrics, thereby synchronizing the plurality of processors.

22 Claims, 7 Drawing Sheets

SYSTEM AND METHOD FOR SYNCHRONIZING A PLURALITY OF PROCESSORS IN A MULTIPROCESSOR COMPUTER PLATFORM EMPLOYING A GLOBAL CLOCK COUNTER

BACKGROUND

In distributed computer systems such as multiprocessor computer platforms, time stamps are employed to resolve the order of system events by providing a unique code that identifies each system event. In general, a time stamp is generated by an event trigger to provide an absolute or relative identification of the time at which the event occurred. The time stamp for a sequence of events on a system may be chosen to indicate the time before a sequence of events, the time immediately before a specific event, the time immediately after a specific event, or the time after all events have occurred. Regardless of the process of time stamping selected, the synchronization of time stamps is important. Unsynchronized or out-of-order time stamps may cause events to be executed in the wrong order leading to data corruption or a system crash.

In a multiprocessor system, time stamps may be generated from different sources, e.g., from different processors. Typically, each time stamp is issued by the processor handling the event and the processor's associated interval timer. In order to coordinate the time stamps between processors, the processors are synchronized to correct any discrepancies between the interval timers. FIG. 1 depicts a multiprocessor computer platform 100 employing a prior art solution for synchronizing a monarch processor and a slave processor. A monarch processor 102 having an interval timer 104 is associated with the multiprocessor computer platform's hardware space. An interval timer synchronization structure 106 is located in the platform's kernel space which provides the parameters necessary for synchronizing interval timers of other processors to the interval timer 104.

Similar to monarch processor 102, slave processor 108 is disposed in the hardware space of the computer platform 100 and includes an interval timer 110 as a local timing reference. Slave processor 108 is associated with the interval timer synchronization structure 106 disposed in the kernel space. In one existing process, the monarch processor 102 synchronizes the slave processor 108 at periodic intervals depending on the desired performance overhead. The longer the interval between synchronization operations, the less the performance overhead, but the greater the chance of clock drift. When it is time to synchronize the slave processor 108, the monarch processor sends the slave processor 108 an interrupt 114 which specifies to the slave processor 108 a timing window rendezvous.

At the agreed upon timing window, the slave processor 108 sends a handshake 116 to the monarch processor 102. Upon receiving the handshake 116, the interval timer synchronization structure 106 of the monarch processor 102 provides the slave processor 108 with a time value 118 which is indicative of the time maintained by the interval timer 104. The interval timer synchronization structure 106 of slave processor 108 uses the time value 118 to update its synchronization data to compensate for any discrepancies between the monarch's interval timer 104 and the local interval timer 110. This synchronization processes may require additional overhead (e.g., OS cycles) if the monarch processor 102 and slave processor 108 have different clock speeds.

If the monarch processor and slave processor do not respond to each other at the agreed upon timing window, the synchronization fails. Since each processor runs many other routines, the timing window for the synchronization arbitration between the monarch processor and slave processor is generally short. The shorter the timing window, however, the greater the chance either the monarch processor or slave processor will have a conflict and will not be available.

As discussed, the conventional clock synchronization processes are limited by the frequency of synchronization and duration of the timing window. Additionally, the synchronization process may be encumbered by the number of slave processors. In a multiprocessor computer platform, the monarch processor must synchronize each slave processor. Hence, in a system of n slave processors, n synchronization rendezvous events must be coordinated. This can tax the platform to the point that the monarch processor spends a substantial amount of its resources synchronizing slave processors.

SUMMARY

A system and method for synchronizing a plurality of processors in a multiprocessor computer platform are disclosed. In one system embodiment, a first processor and a second processor may access a global time value associated with a globally accessible clock counter. Each processor may access its respective local time value and adjust its respective synchronization parametrics, thereby synchronizing the plurality of processors.

DETAILED DESCRIPTION OF THE DRAWINGS

Figure 1:
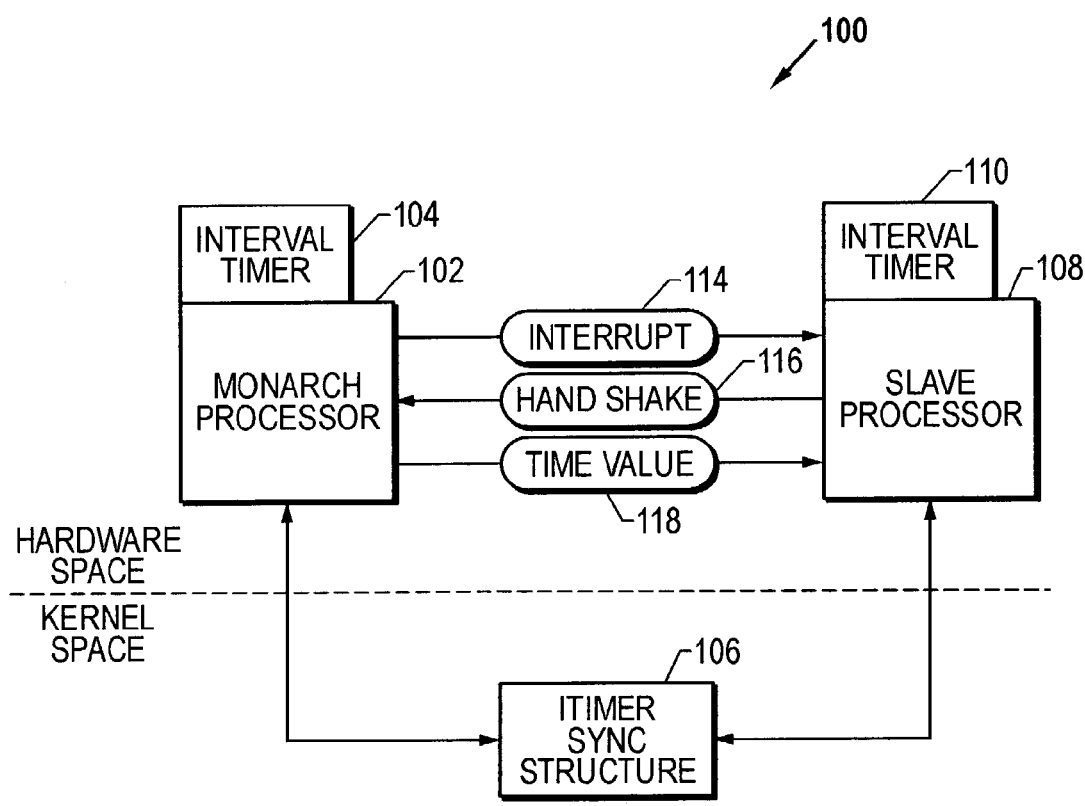
FIG. 1 (Prior Art) depicts a functional block diagram of a multiprocessor computer platform employing an existing solution for synchronizing a monarch and a slave processor.
Figure 2:
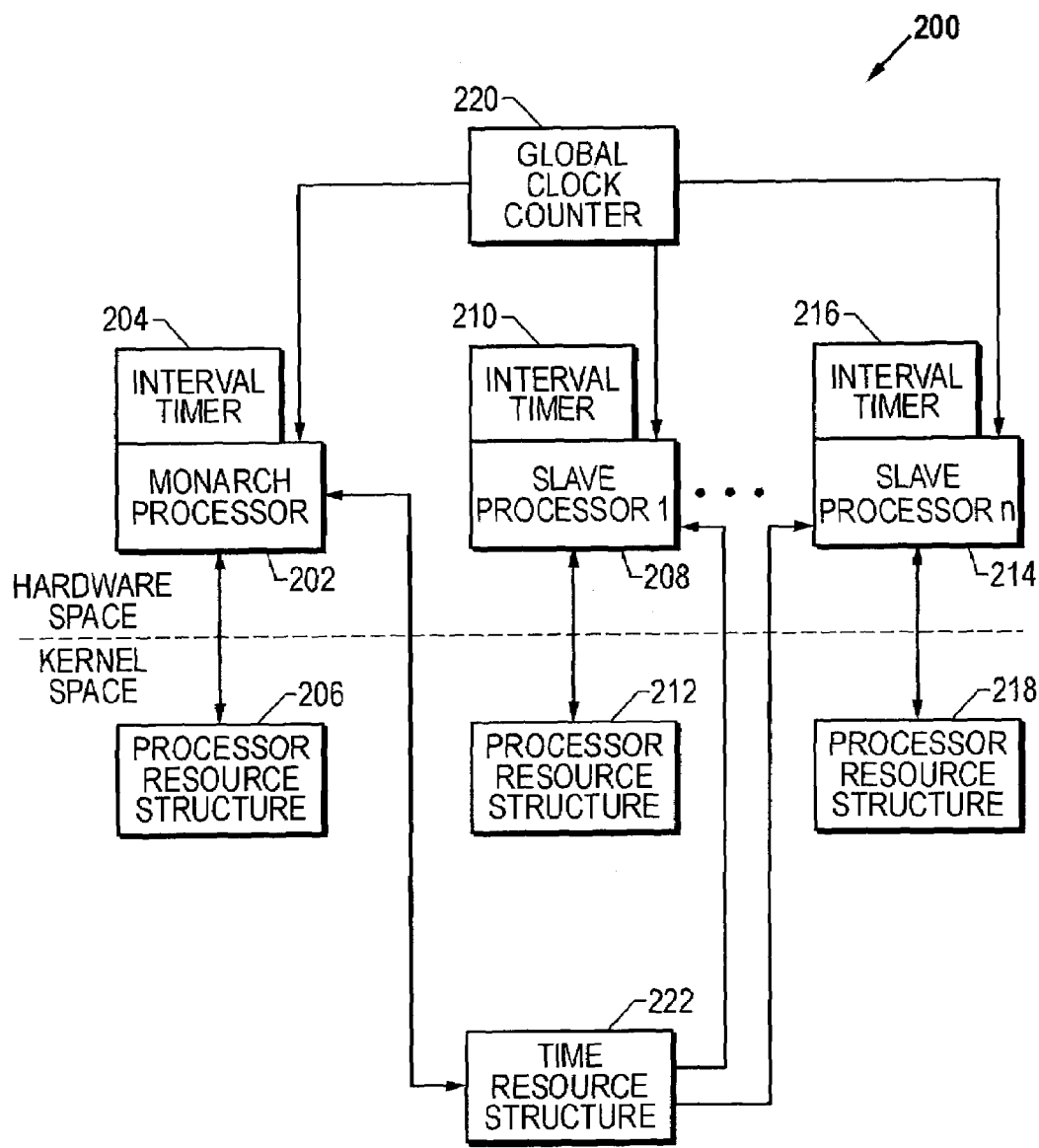
FIG. 2 depicts a functional block diagram illustrating one embodiment of a system for synchronizing a plurality of processors in a multiprocessor computer platform employing a global clock counter.

In the drawings, like or similar elements are designated with identical reference numerals throughout the several views thereof, and the various elements depicted are not necessarily drawn to scale. Referring now to FIG. 2, depicted therein is an embodiment of a multiprocessor computer platform 200 employing a scheme for synchronizing a plurality of processors. A monarch processor 202 includes a local interval timer 204 associated with the multiprocessor computer platform's hardware space and is operable with a processor resource structure 206 associated with the multiprocessor computer platform's kernel space. The interval timer 204 may only be accessed by the monarch processor 202. In one implementation, following a boot-time initialization, the interval timer 204 may generate a free-running clock signal that provides a timing reference for monarch processor-related events such as the duration of signal elements and sampling rate. The periodic, accurately spaced signals generated by the interval timer 204 may be used for such purposes as timing, regulation of the operations of a processor, or generation of interrupts. As will be discussed in more detail hereinbelow, the processor resource structure 206 provides the parameters necessary for the monarch processor to synchronize the multiprocessor computer platform 200 and issue time stamps.

A slave processor 208 includes an interval timer 210 in the hardware space of the platform 200 and is operable with a processor resource structure 212 disposed in the kernel space. As with monarch processor 202 and interval timer 204, the interval timer 210 may only be accessed by slave processor 208. Additionally, the functionality of interval timer 210 may be similar to that of the interval timer 204 and may include generating periodic signals for the synchronization of events or transmissions between processors. Similar to the processor resource structure 206, the processor resource structure 212 provides the necessary parameters to synchronize the slave processor 208 with the system and issue time stamps.

It should be appreciated that the system described herein may be practiced in a multicellular environment with partitioning capabilities wherein the multiprocessor, multicellular architecture can be partitioned into any configuration. In one implementation, platform 200 may include another slave processor 214 that is provided with an interval timer 216 and processor resource structure 218 similar to the aforementioned interval timer 210 and processor resource structure 212, respectively. It should be appreciated that although a system of three processors is illustrated in particular detail, the platform 200 may comprise any number of processors.

Moreover, the platform 200 may execute at least one instance of an operating system (OS) such as UNIX, HP-UX®, Windows® NT®, Sun Solaris®, Linux, or the like. Preferably, the computer platform 200 is highly reliable, adaptable, and efficient to provide leading performance and high-end server capabilities to handle today's mission-critical applications. In particular, the platform 200 may be scalable and may include processors of different clock speeds, i.e., asynchronous processors.

A global clock counter 220 provides a timing signal that may be used in conjunction with the interval timers to synchronize the processors of the multiprocessor computer platform 200. Contrary to the interval timers 204, 210, and 216, the global clock counter 220 is accessible by any of the processors including the monarch processor 202, slave processor 208, and slave processor 214. A time resource structure 222 associated with the platform's kernel space provides globally accessible time stamp computation parametrics that may be accessed by a processor in order to issue a time stamp.

Figure 3A:
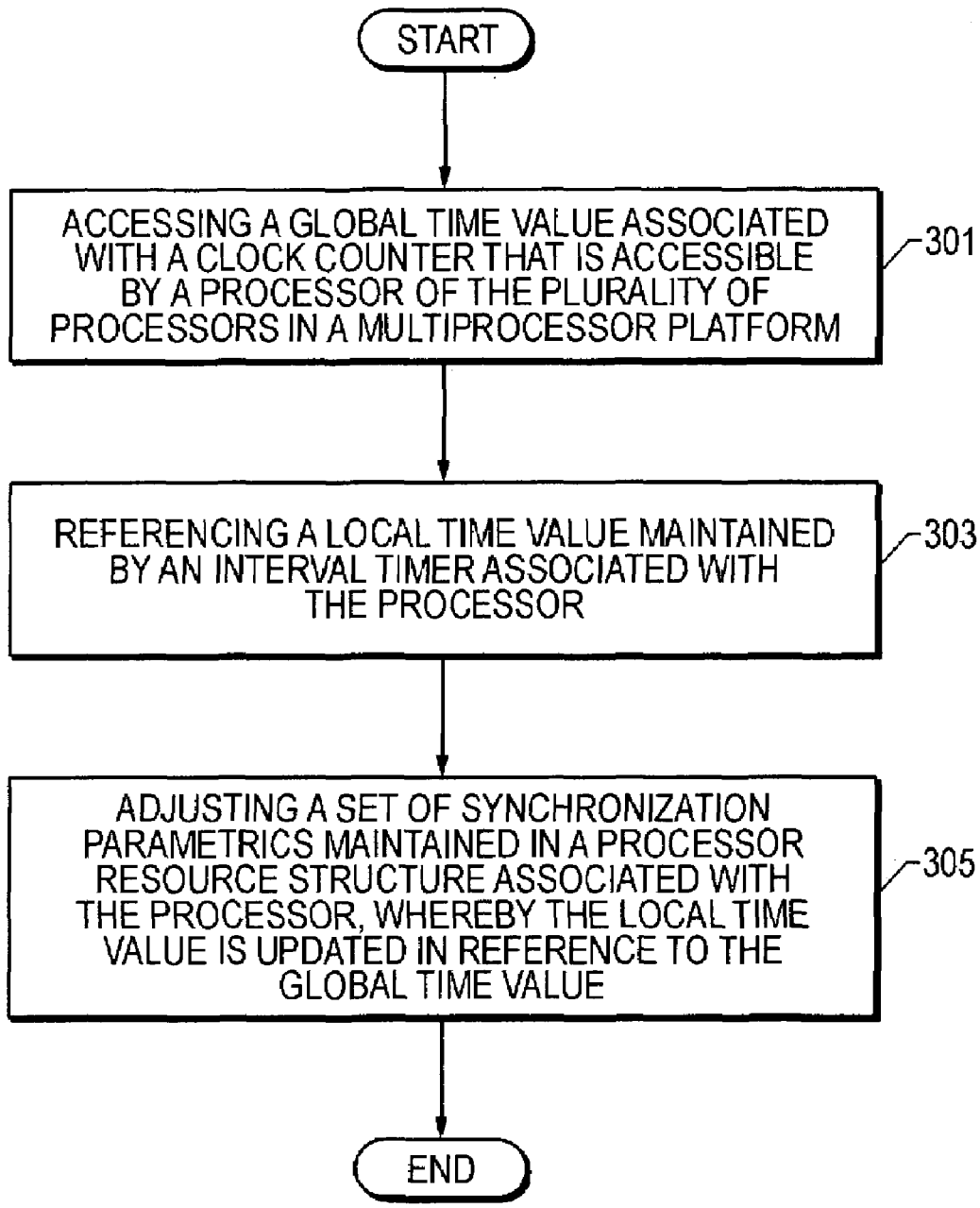
FIG. 3A depicts a flow chart illustrating one embodiment of a method for synchronizing a plurality of processors in a multiprocessor computer platform.

FIG. 3A illustrates one embodiment of a method for synchronizing a plurality of processors in a multiprocessor computer platform. The method includes accessing a global time value associated with a clock counter that is accessible by a processor of the plurality of processors (block 301), referencing a local time value maintained by an interval timer associated with the processor (block 303), and adjusting a set of synchronization parametrics maintained in a processor resource structure associated with the processor (block 305), whereby the local time value is updated in reference to the global time value.

Figure 3B:
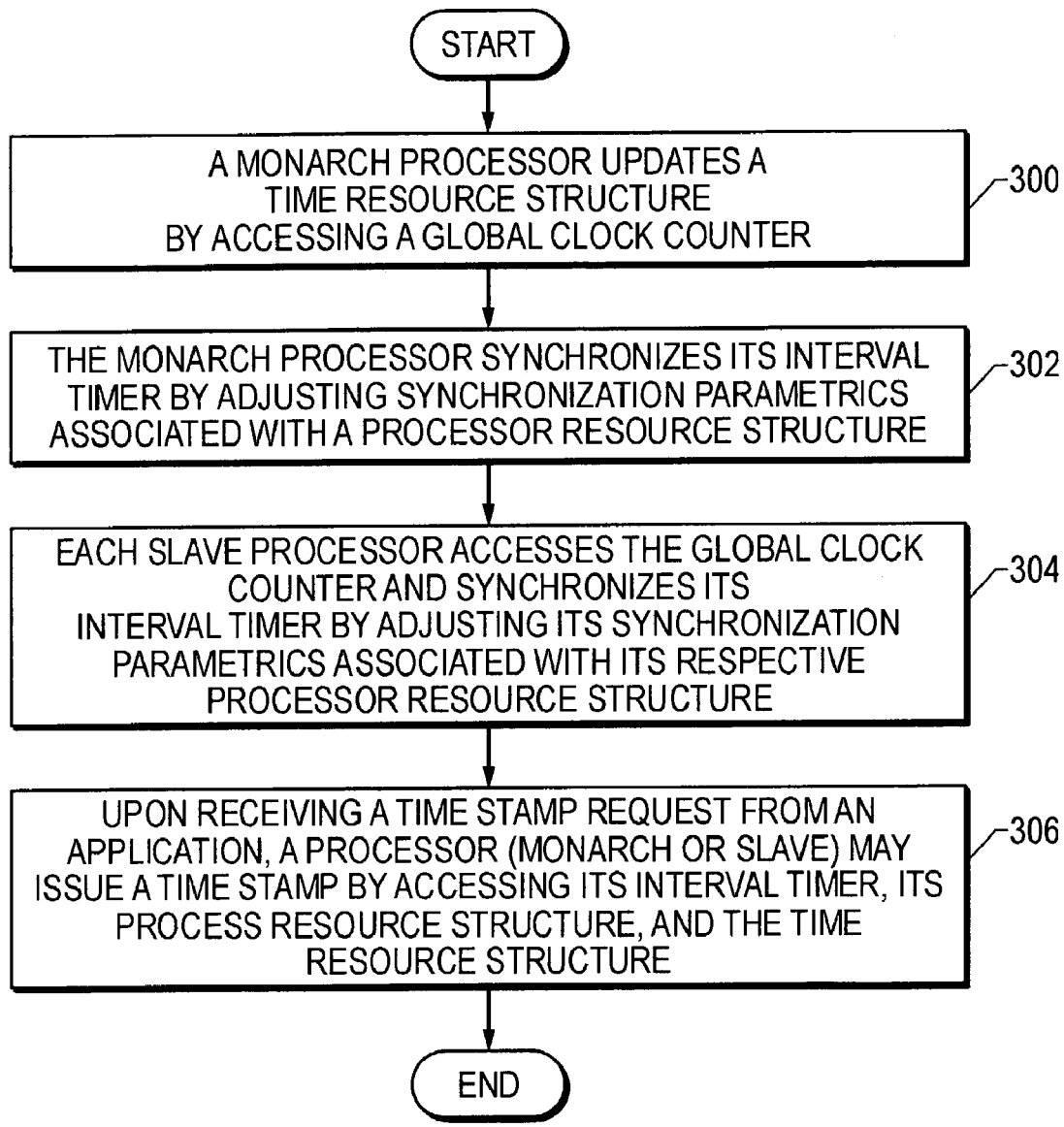
FIG. 3B depicts a flow chart illustrating another embodiment of a method for synchronizing a plurality of processors in a multiprocessor computer platform.

FIG. 3B illustrates another embodiment of a method for synchronizing a plurality of processors in a multiprocessor computer platform. At boot time, the time resource structure and processor resource structure may be initialized and then periodically updated by the monarch processor upon receipt of a clock interrupt event, for example. At block 300, a monarch processor updates a time resource structure by accessing a global clock counter. In particular, the monarch processor may update the respective values of the Base Time structure and Base Count structure associated with the time resource structure so that accurate time stamps may be issued based on the global time value. At block 302, the monarch processor synchronizes its internal interval timer by adjusting synchronization parametrics associated with its processor resource structure disposed in the multiprocessor computer platform's kernel space. Independently, upon receipt of a clock interrupt, each slave processor accesses the global clock counter and synchronizes its interval timer by adjusting the synchronization parametrics associated with its respective processor resource structure (block 304). Processors may loose synchronization due to time offset, frequency offset, or relative clock drift, for example. Time offset is due to the interval timers of processors starting at different instants in time. Alternatively, frequency offset is due to the differences in frequencies between the two interval timers. Furthermore, relative clock drift is an indication of variation in clock synchronization over time and can be caused by a variety of factors including temperature fluctuations. By adjusting the synchronization parametrics associated with the processor resource structure of each processor via a globally-accessible clock counter, a scheme is provided herein for individually correcting errors in synchronization on an as-needed basis.

If there is a time stamp request from a user application, a time stamp process may then take place at a processor serving the request. Accordingly, at block 306, upon receiving a time stamp request from an application or other source, a processor (monarch or slave) may issue a time stamp by accessing its interval timer, the synchronization parametrics associated with its process resource structure, and the shared time resource structure. The synchronization parametrics associated with each processor provide a scheme for each processor to adjust or compensate its local time value to an equivalent global time value and generate an accurate time stamp based on time stamp computational parametrics associated with the time resource structure.

Figure 4:
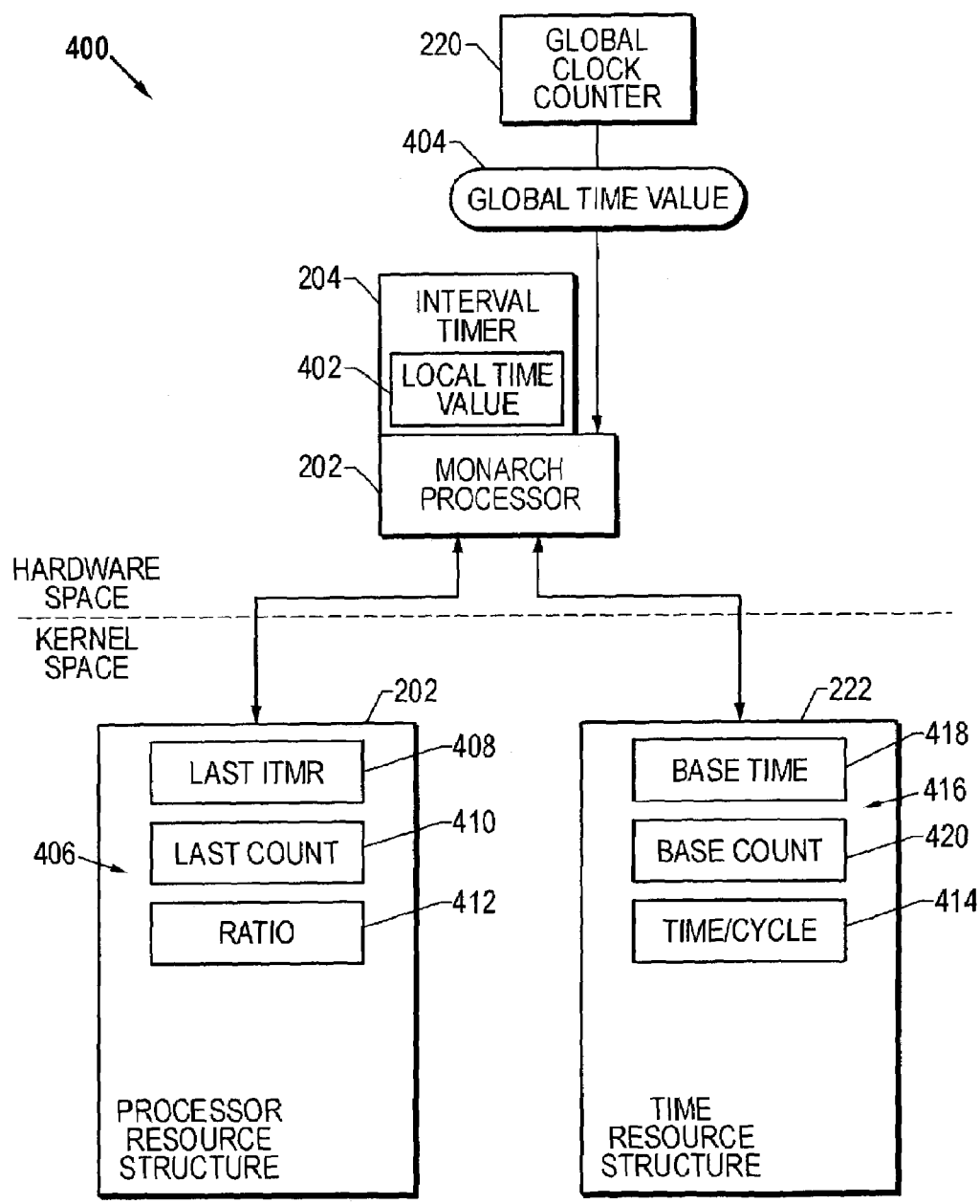
FIG. 4 depicts a functional block diagram illustrating one embodiment of a system for synchronizing a monarch processor according to the teachings herein.

FIG. 4 depicts one embodiment of a system 400 for synchronizing the monarch processor 202 according to the teachings set forth hereinabove. The monarch processor 202 includes the interval timer 204, which is operable to maintain a local time value 402. As previously discussed, the interval timer 204 may be initialized at boot time and may start a free-running counter at zero or a predetermined value. The free-running counter provides the local time value 402 which may only be read by the monarch processor 202 during run time. The global clock counter 220 provides a global time value 404 which may be read by the monarch processor 202 or another processor. Similar to the interval timer 204, the global clock counter may be a free-running counter initialized at boot time and may comprise a "read-only" value. The monarch processor upon receiving a clock interrupt event uses its local time value 402 and the global time value 404 to adjust synchronization parametrics 406 stored in the processor resource structure 202. The synchronization parametrics 406 describe the various relationships that may be constructed between the local interval timer 204 and the global clock counter 220, in addition to maintaining timing offsets, ratios, etc. As illustrated, the synchronization parametrics include a Last Interval Timer structure 408, a Last Count structure 410, and a Ratio structure 412. In one embodiment, the value of the Ratio structure 412 is updated as follows:

$$R = \frac{\Delta T_{global}}{\Delta T_{local}} = \frac{(T_{global} - T_{g\_old})}{(T_{local} - T_{l\_old})}$$

wherein $T_{global}$ is the global time value 404;
$T_{g\_old}$ is the value of the Last Count Structure 410;
$T_{local}$ is the local time value 402; and
$T_{l\_old}$ is the value of the Last Interval Timer structure 408.

Once the new value (R) of the Ratio structure 412 is calculated, the value of the Last Interval Timer structure 408 ($T_{l\_old}$) and the value of the Last Count structure 410 ($T_{g\_old}$) are updated as follows:

$$T_{g\_old} = T_{global}$$

$$T_{l\_old} = T_{local}$$

Accordingly, the synchronization parametrics and, in particular, the Ratio structure 412 provide an efficient mechanism by which the monarch synchronizes its timer to the global timer independent of any slave processor's timing. Since a one-to-one synchronization involving no rendezvous events consumes fewer OS cycles, the scheme disclosed herein does not overload the monarch processor. It should be appreciated, however, that a variety of other synchronization parametrics may be employed to synchronize the monarch processor 202 with the multiprocessor computer platform using the global clock scheme.

Additionally, the time resource structure 222 associated with the kernel space of the multiprocessor system may be updated by the monarch processor. As alluded to before, the time resource structure is operable to maintain time stamp computational parametrics 416 that the monarch processor 202 may employ to issue a time stamp. The monarch processor 202 accesses the global time value 404 of the global clock counter 220 and calculates the elapsed time since the previous update to initialize the time stamp computational parametrics 416. The time stamp computational parametrics may include a Base Time structure 418, a Base Count structure 420, and a Time/Cycle structure 414. In one embodiment, the new values of the Base Time structure 418 ($T_{base}$) and Base Count structure 420 ($C_{base}$) are updated as follows:

$$T'_{base} = T_{base} + \Delta T$$

$$C_{base} = T_{global}$$

wherein $T_{base}$ is the existing value of the Base Time structure 418;
$\Delta T$ is the elapsed time since the previous calculation; and
$T_{global}$ is the global time value 404.

Additionally, the value of the Time/Cycle structure 414 is a processor-defined constant dependent upon the clock speed of the global clock counter 220. The value of the Time/Cycle structure 414 may be employed to issue a time stamp. It should be appreciated, however, that other types of time stamp computational parametrics may be employed to provide the computational information necessary to generate a time stamp.

Figure 5:
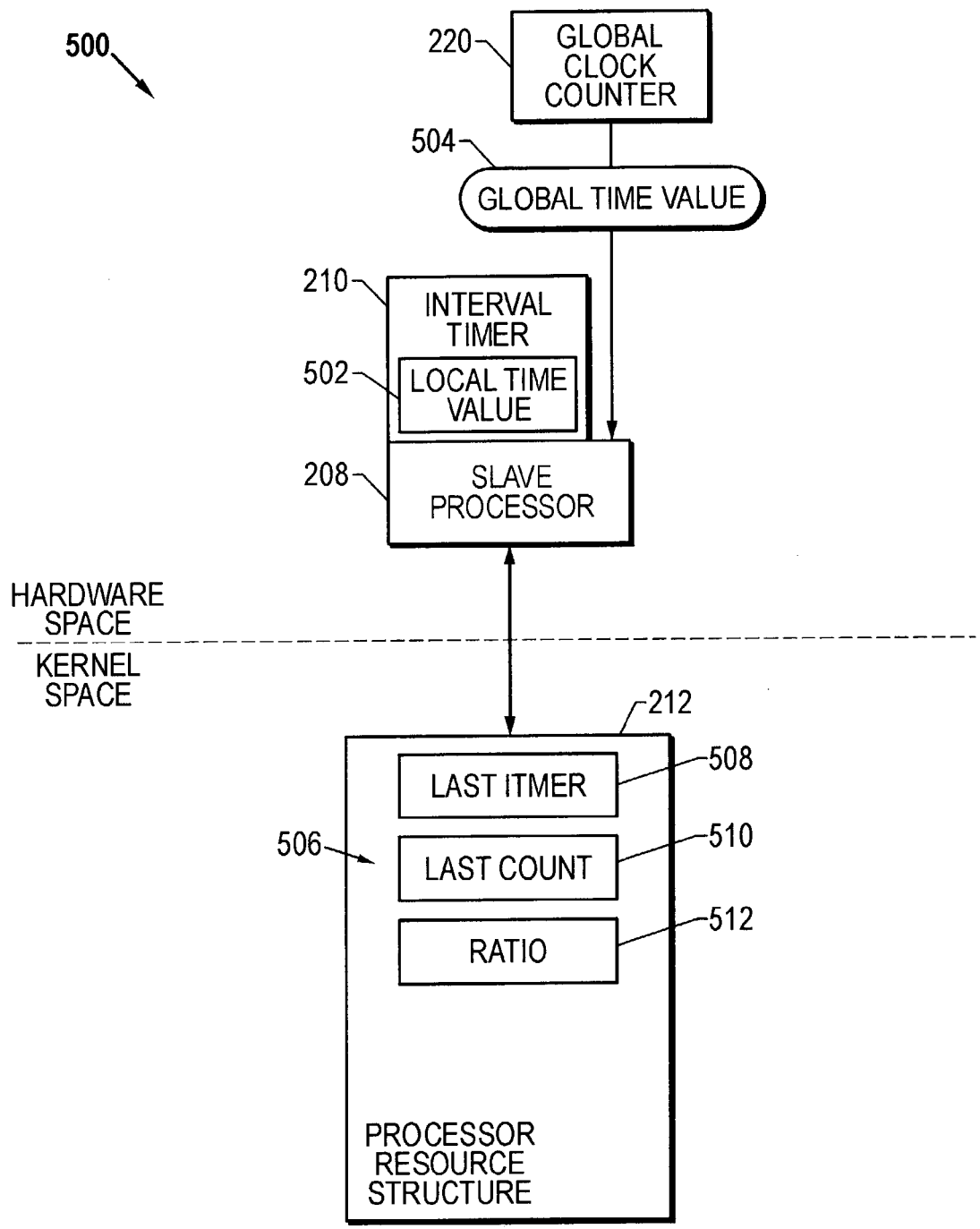
FIG. 5 depicts a functional block diagram illustrating one embodiment of a system for synchronizing a slave processor according to the teachings herein.

FIG. 5 illustrates one embodiment of a system 500 for synchronizing the slave processor 208 according to the teachings set forth hereinabove. The slave processor 208 includes the interval timer 210 having a local time value 502. The slave processor 208 may access a global time value 504 associated with the global clock counter 220. By comparing local time value 502 and the global time value 504, slave processor is able to adjust synchronization parametrics 506 stored in the processor resource structure 212 so that the slave processor 208 is synchronized with respect to the global clock counter 220. As illustrated and previously discussed, the synchronization parametrics include a Last Interval Timer structure 508, a Last Count structure 510, and a Ratio structure 512. By employing synchronization parametrics in conjunction with a global clock counter and local interval timers for independent timing adjustments, the scheme of the present disclosure minimizes the synchronization overhead, and, in particular, minimizes the monarch processor's synchronization overhead. The low synchronization overhead, in turn, allows the processors to be synchronized as often as every OS tick, which is the minimum interval for clock synchronization. Hence, the synchronized multiprocessor computer platform employing the schemes set forth herein is able to issue time stamps which accurately reflect the order of events and expiration dates of transaction-dependent events.

Figure 6:
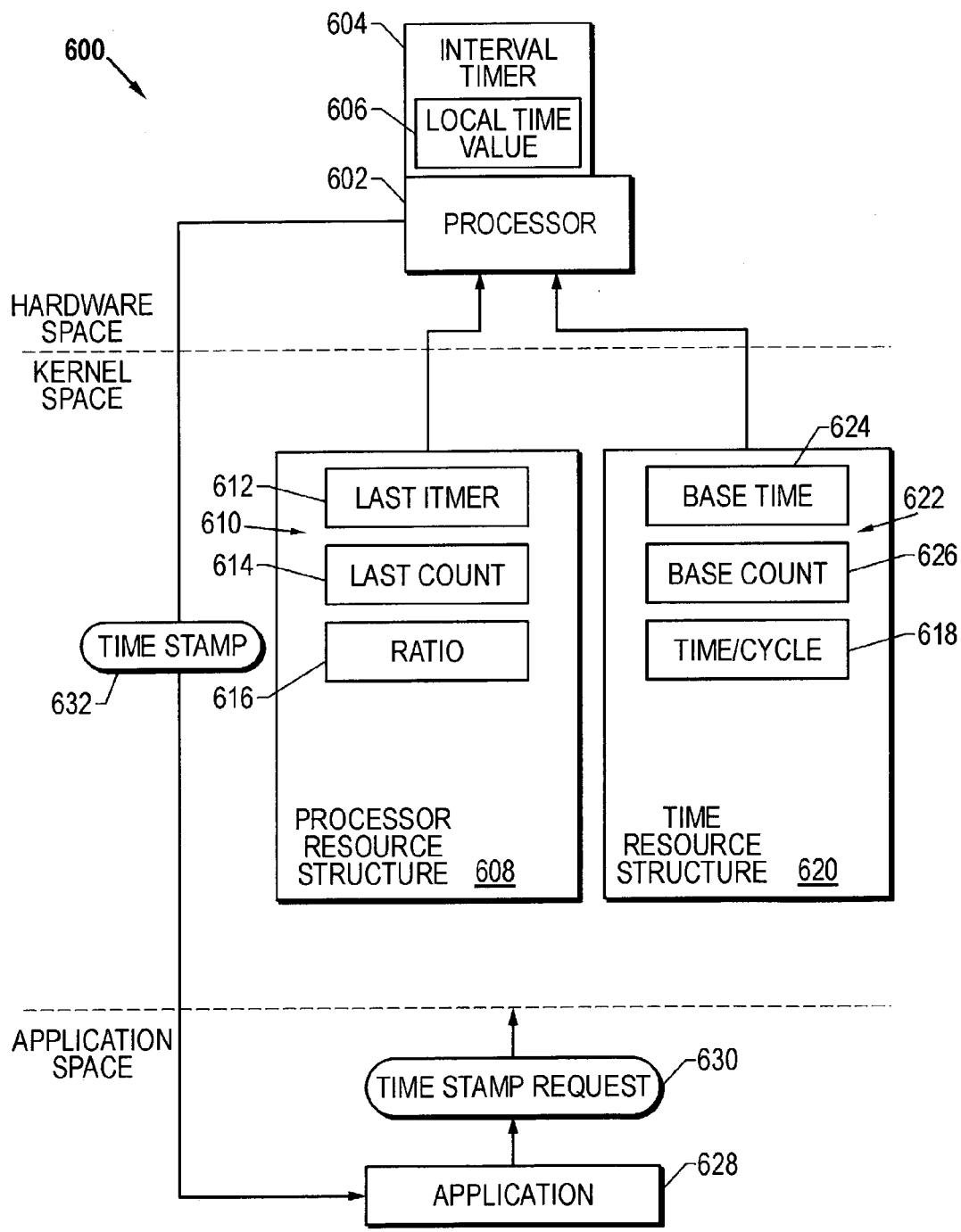
FIG. 6 depicts a functional block diagram illustrating one embodiment of a system for issuing a time stamp in accordance with the teachings presented herein.

FIG. 6 depicts a functional block diagram illustrating one embodiment of a system 600 for issuing time stamps in accordance with the teachings provided herein. A processor 600 which may be a monarch or a slave processor is disposed within a computer platform's hardware space. An interval timer 604 includes a local time value 606. A processor resource structure 608 associated with processor 602 includes synchronization parametrics 610 which comprise the aforementioned Last Interval Timer structure 612, Last Count structure 614, and Ratio structure 616. A globally-accessible time resource structure 620 includes time stamp computational parametrics 622 which comprise the previously discussed Base Time structure 624, Base Count structure 626, and a Time/Cycle structure 618. An application 628 in a processor or application space generates a time stamp request 630 to the system kernel space which is ultimately directed to processor 602. Upon receiving the time stamp request from the application 628, the processor 602 issues a time stamp by accessing its local time value 606, its synchronization parametrics 610, and the time resource computational parametrics 622, and then performing a time stamp computation. The computation may take the following form:

$$T_{stamp} = T_{base} + (\Delta T_{count} \times T/C)$$

wherein $$\Delta T_{count} = T_{count} - C_{base}; \text{ and}$$

$$T_{count} = (R \times (T_{local} - T_{l\_old})) + T_{g\_old}$$

wherein $T_{stamp}$ is the time stamp;
$T_{base}$ is the value of the Base Time structure 624;
$\Delta T_{count}$ is the change in the global time value;
T/C is the value associated with the Time/Cycle structure 618;
$T_{count}$ is the current global time value;
$C_{base}$ is the value of the Base Count structure 626;

R is the value of the Ratio structure 616;
$T_{local}$ is the local time value 606;
$T_{l\_old}$ is the value of the Last Interval Timer structure 612; and
$T_{g\_old}$ is the value of the Last Count structure 614.

The computed time stamp 632 may thereafter be returned to the application 628 for subsequent use. As illustrated, the synchronization scheme works well with asynchronous multiprocessor computer platforms that include multiple processors having different clock speeds. In particular, the time resource structure and processor resource structure provide a localized functionality to calculate offsets necessary to issue accurate time stamps at the processor level in real-time with little or no impact on the monarch processor, thereby lowering the overhead associated with the process. It should be appreciated that although a time stamp request is depicted as originating from an application, such a time stamp request may originate from any source in the hardware, kernel or application space.

Although the systems and methods of the present disclosure have been particularly described with reference to certain illustrations, it is to be understood that they are to be treated as exemplary embodiments only. Various changes, substitutions and modifications can be realized without departing from the spirit and scope of the invention as defined by the appended claims.

What is claimed is:

1. A system for synchronizing a plurality of processors in a multiprocessor computer platform, comprising:
    a clock counter globally accessible to said plurality of processors, said clock counter having a global time value;
    a first interval timer associated with a first processor of said plurality of processors, said first interval timer having a local time value; and
    a processor resource structure associated with said first processor, said processor resource structure including first synchronization parametrics, wherein said first processor is operable to access said global time value and adjust said first synchronization parametrics based on said local time value and said global time value, said first synchronization parametrics comprising a ratio structure operable to maintain a ratio value between an elapsed global time value and an elapsed local time value.

2. The system as recited in claim 1, further comprising:
    a second interval timer associated with a second processor of said plurality of processors, said second interval timer having a local time value; and
    a processor resource structure associated with said second processor, said processor resource structure including second synchronization parametrics, wherein said second processor is operable to access said global time value and adjust said second synchronization parametrics based on said local time value and said global time value.

3. The system as recited in claim 2, wherein said first processor comprises one of a monarch processor and a slave processor.

4. The system as recited in claim 2, wherein said second processor comprises one of a monarch processor and a slave processor.

5. The system as recited in claim 2, wherein said clock counter is associated with said multiprocessor computer platform's hardware space.

6. The system as recited in claim 2, wherein said first and second processors are arranged in a cellular partition associated with said multiprocessor computer platform's hardware space.

7. The system as recited in claim 2, wherein said first and second interval timers are associated with said multiprocessor computer platform's hardware space.

8. The system as recited in claim 2, further comprising a time resource structure having time stamp computation parametrics, wherein said first processor is operable to access said time stamp computation parametrics and issue a time stamp based on said first interval timer and said time stamp computation parametrics.

9. The system as recited in claim 8, wherein said time resource structure is associated with said multiprocessor computer platform's kernel space.

10. The system as recited in claim 8, wherein said time stamp is operable to be issued in response to a request from said multiprocessor computer platform's application space.

11. A method for synchronizing a plurality of processors in a multiprocessor computer platform, comprising:
    accessing a global time value associated with a clock counter that is accessible by a processor of said plurality of processors;
    referencing a local time value maintained by an interval timer associated with said processor; and
    adjusting a set of synchronization parametrics maintained in a processor resource structure associated with said processor, whereby said local time value is updated in reference to said global time value, said synchronization parametrics comprising a ratio structure operable to maintain a ratio value between an elapsed global time value and an elapsed local time value.

12. The method as recited in claim 11, further comprising updating time stamp computation parametrics maintained in a time resource structure.

13. The method as recited in claim 11, wherein said processor comprises a monarch processor.

14. The method as recited in claim 11, wherein said processor comprises a slave processor.

15. A system for synchronizing a plurality of processors in a multiprocessor computer platform, comprising:
    means for accessing a global time value associated with a clock counter that is accessible by a processor of said plurality of processors; and
    means for adjusting a set of synchronization parametrics maintained in a processor resource structure, said processor resource structure being associated with said processor, whereby a local time value maintained by said processor's interval timer is updated in reference to said global time value, said synchronization parametrics comprising a ratio structure operable to maintain a ratio value between an elapsed global time value and an elapsed local time value.

16. The system as recited in claim 15, further comprising means for updating time stamp computation parametrics maintained by a time resource structure.

17. The system as recited in claim 16, further comprising means for issuing a time stamp based on said local time value and said time stamp computation parametrics.

18. The system as recited in claim 17, wherein said time stamp is issued in response to a request from said multiprocessor computer platform's application space.

19. A computer platform, comprising:
- a clock counter globally accessible to a plurality of processors disposed in said computer platform's hardware space, said clock counter having a global time value;
- an interval timer associated with each of said plurality of processors, said interval timer maintaining a local time value; and
- a processor resource structure associated with each of said plurality of processors, said processor resource structure being disposed in said computer platform's kernel space, wherein each processor is operable to access said global time value independently and adjust a set of synchronization parametrics maintained by its processor resource structure, said synchronization parametrics comprising a ratio structure operable to maintain a ratio value between an elapsed global time value and an elapsed local time value.

20. The computer platform as recited in claim 19, wherein said plurality of processors are organized into a multicellular system.

21. The computer platform as recited in claim 19, further comprising a time resource structure having time stamp computation parametrics, wherein each of said plurality of processors is operable to access said time stamp computation parametrics and issue a time stamp based on said local time value and said time stamp computation parametrics.

22. The computer platform as recited in claim 21, wherein said time stamp is operable to be issued in response to a request from said computer platform's application space.

* * * * *